United States Patent [19]

Kokubun et al.

[11] Patent Number: 4,565,300

[45] Date of Patent: Jan. 21, 1986

[54] DISPENSING MECHANISM FOR VENDING MACHINES OR THE LIKE

[75] Inventors: Yoshikazu Kokubun; Osamu Anazawa, both of Gunma, Japan

[73] Assignee: Sanden Corporation, Gunma, Japan

[21] Appl. No.: 559,234

[22] Filed: Dec. 8, 1983

[30] Foreign Application Priority Data

Dec. 8, 1982 [JP] Japan .............................. 57-215087

[51] Int. Cl.[4] ...................... B65G 59/06; G07F 11/24

[52] U.S. Cl. ................................... 221/116; 221/124

[58] Field of Search .............. 221/112, 114, 115, 116, 221/124; 414/266, 267

[56] References Cited

U.S. PATENT DOCUMENTS

| | | | |
|---|---|---|---|
| 1,270,194 | 6/1918 | Nybak | 221/124 |
| 1,889,318 | 11/1932 | Larson et al. | 221/124 |
| 2,563,264 | 8/1951 | Andrews | 221/115 |
| 2,923,434 | 2/1960 | Gabrielsen | 221/112 |
| 3,057,513 | 10/1962 | Turman | 221/114 |
| 4,354,616 | 10/1982 | Camp | 221/116 |

*Primary Examiner*—William L. Freeh

*Attorney, Agent, or Firm*—Banner, Birch, McKie & Beckett

[57] ABSTRACT

An article dispenser for vending machines is disclosed. The article dispenser includes an article storage area which has a bottom opening through which the articles are dispensed and a front opening through which the articles are loaded to form two vertical rows. A rotatable shaft extends vertically in the storage area to divide the storage area into the two vertical rows. A pair of pivotable doors are disposed at the bottom opening to block the passage of articles therethrough. The doors are pivotably supported by two axially spaced shafts which extend along the same axis. A control plate is fixed on the lower end portion of the rotatable shaft and contacts the lower surface of the pivotable doors to control the pivotal movement of the door between open and closed positions. A holder member is fixed on the rotatable shaft to prevent the articles disposed above the lowermost article from falling when the lowermost article is discharged from the bottom opening.

8 Claims, 12 Drawing Figures

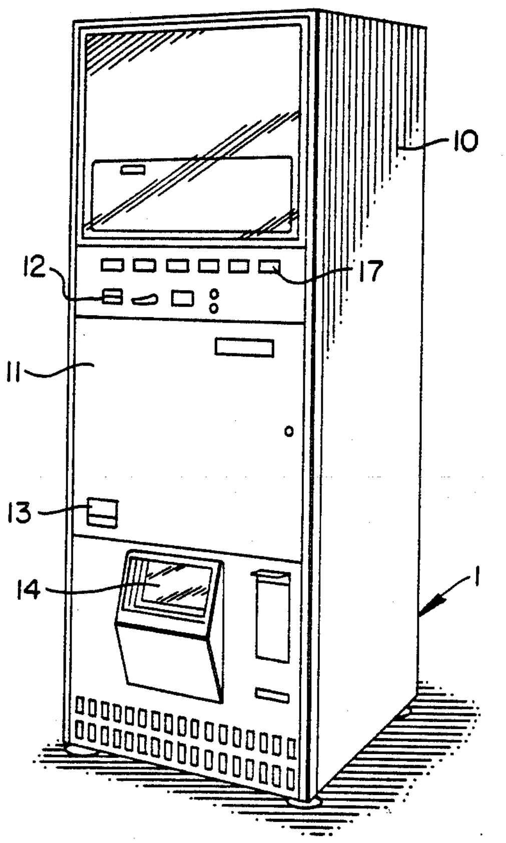
FIG. 1.
FIG. 2.
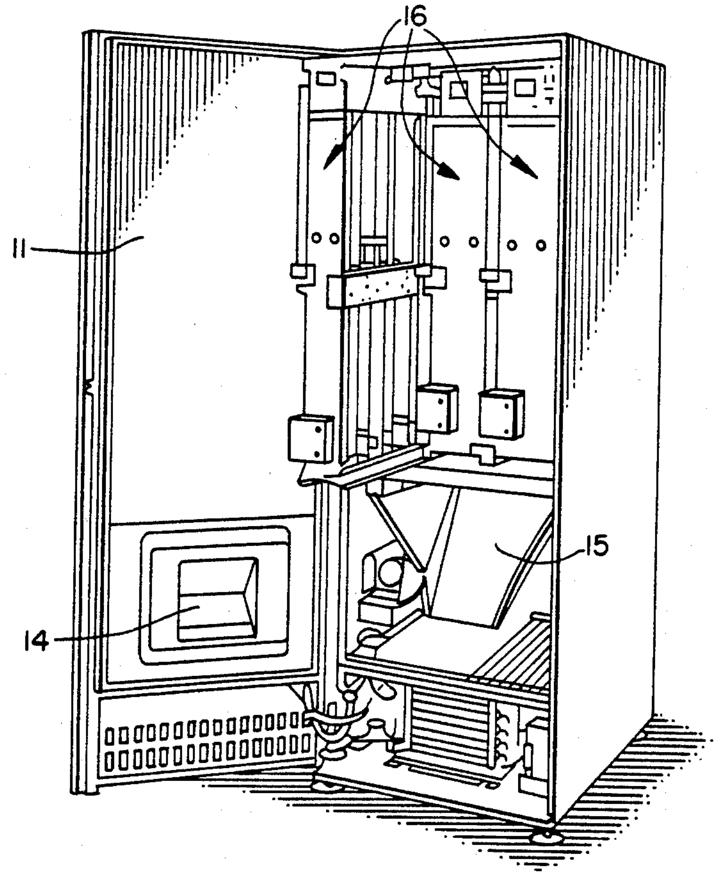

DISPENSING MECHANISM FOR VENDING MACHINES OR THE LIKE

TECHNICAL FIELD

This invention relates to vending machines, and more particularly, to a dispensing mechanism adapted for dispensing rectangular parallelepiped or cube shaped paper cartons containing a beverage or other liquid.

BACKGROUND OF THE INVENTION

Various types of dispensing mechanisms have been used depending on the types of food products or goods vended. One known type of dispensing mechanism is a spiral type which is used to vend bottles or cans.

Spiral type dispensing mechanisms include a vertical shaft with end portions journaled at the upper and lower ends of a storage area for the articles. A spiral or helical element is disposed around and connected to the vertical shaft for rotation with the shaft. The articles or package goods are loaded along the spiral element and the vertical shaft. These packages are moved downwardly by the rotation of the spiral element and delivered one by one from the lower end of the shaft.

In this type of mechanism, the spiral element is located adjacent to each of the packages, i.e., the spiral element extends between the upper and lower portions of each package and forms an axial gap between adjacent packages. However, since each package must be loaded into the axial gaps of the spiral element one by one, the number of articles or packages which can be loaded into a predetermined space is reduced. Also, loading of the articles into the dispensing mechanism is complicated and time consuming.

Another type of dispensing mechanism, known as a chain-elevator type dispensing mechanism, is shown in U.S. Pat. No. 3,193,135. Chain-elevator type dispensing mechanisms are suitable for vending packages or cartons. A chain-elevator type dispensing mechanism includes a plurality of supporting elements each of which carries articles or packages. The supporting elements are connected to a chain, which is moved vertically by a motor. In this mechanism, the construction of the operative elements is very complicated, and the loading of packages or articles is difficult.

A slant shelf type dispensing mechanism, such as shown in U.S. Pat. No. 3,276,624, is another type of known dispensing mechanism for vending bottles or cans. A slant shelf type dispensing mechanism includes at least one slanted shelf member, which acts as a guide for dispensing articles, and a delivery member for dispensing the articles, one by one, from the slanted shelf member. However, construction of the mechanism is very complicated and expensive, and loading of the articles into the storage area is complicated. Also, since the distance between the delivery member and a delivery tray is generally long, articles may be damaged during delivery by striking against the delivery tray.

SUMMARY OF THE INVENTION

It is a primary object of this invention to provide a simple dispensing mechanism for vending machines in which articles are positively held in a narrow space.

It is another object of this invention to provide a dispensing mechanism for vending machines in which loading of articles is accomplished in a simple operation.

It is still another object of this invention to provide a dispensing mechanism for vending machines in which articles are easily released and ejected from a storage area.

It is a further object of this invention to realize the above objects with a simple construction and at a low cost.

A dispensing mechanism for vending machines according to this invention includes an article storage area for holding articles in a stacked disposition. Dispensing of the articles is controlled by a signal generated by a vending switch. The storage area comprises vertically disposed side plates, a back plate, an upper plate and a front support plate attached to the front lower portion of the side plates. The dispensing mechanism comprises a pair of rectangular-shaped flappers or doors which are disposed at a bottom opening of the storage area to block the exit of articles through the bottom opening. The doors are rotatably supported by support shafts. One support shaft extends from the center portion of the back plate and the other support shaft extends from the center portion of the front support plate. The two support shafts lie on the same axis. A rotatable shaft extends vertically within the storage area and is rotatably supported by the upper plate and a support element which is fixed to and extends from the back plate. A driving mechanism is attached to the upper plate and connected to the rotatable shaft. A control member is fixed on the lower portion of the rotatable shaft and contacts the lower surface of the doors to control the opening and closing of the doors. A holder member is removably affixed to the rotatable shaft to hold the articles above the lowermost article in position while the lowermost article is being dispensed through an open door.

Further objects, features and other aspects of this invention will be understood from the following detailed description of preferred embodiments of this invention with reference to the annexed drawings.

BRIEF DESCRIPTION OF THE DRAWINGS

FIG. 1 is a perspective view of a vending machine containing an article dispenser according to the invention;

FIG. 2 is a perspective view of the vending machine of FIG. 1 with the loading door opened;

DETAILED DESCRIPTION OF THE PREFERRED EMBODIMENTS

Figure 3:
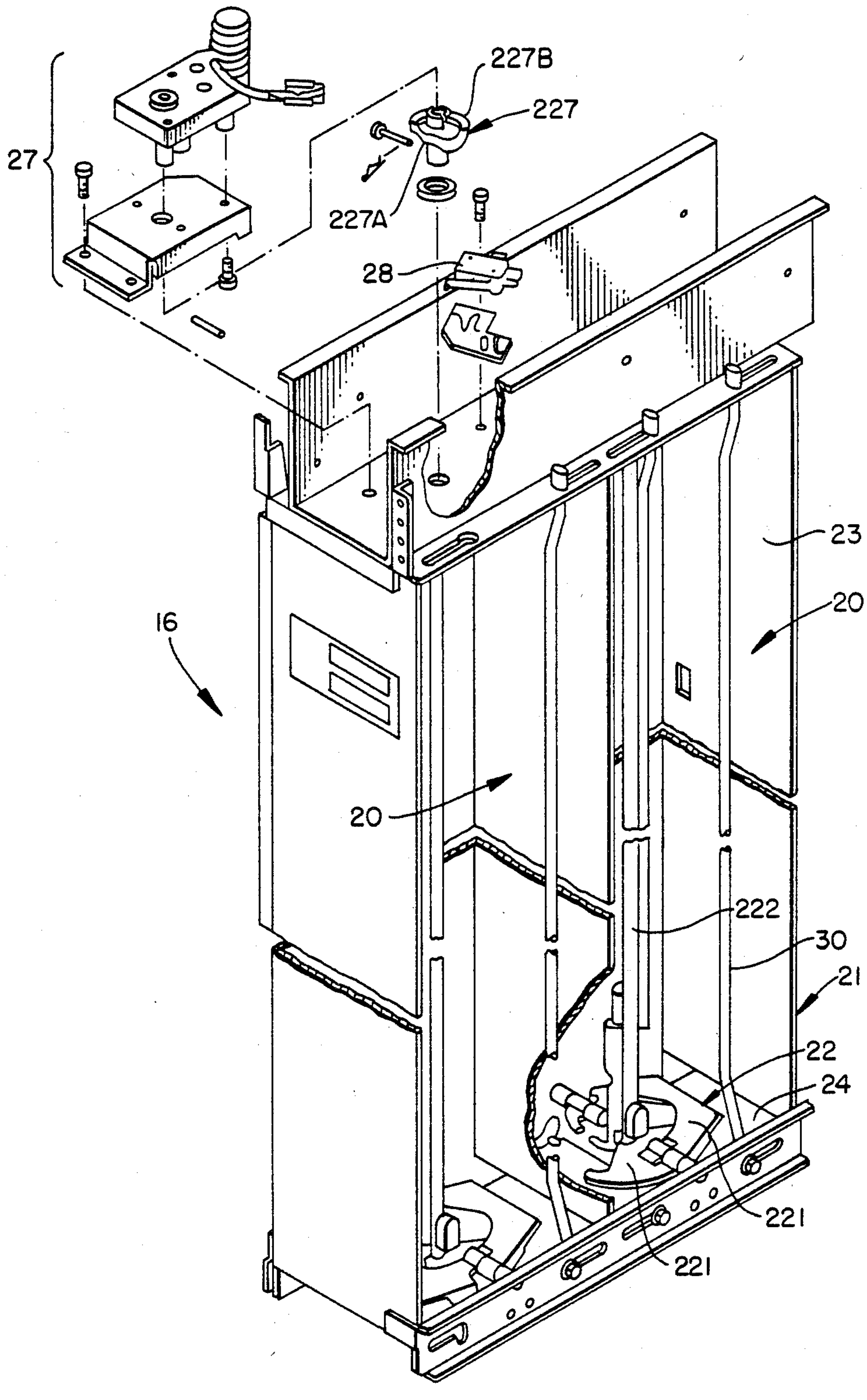
FIG. 3 is an exploded perspective view of a dispenser used in FIG. 2.

In FIGS. 1 and 2, an article vending machine is illustrated. Vending machine I includes a cabinet 10 having a loading door 11 which extends substantially across the face of cabinet 10 and is hinged along the left vertical edge of cabinet 10 in a conventional manner (not shown). A coin slot 12 and a coin return opening 13 are located on the front face of loading door 11. A vending stage 14 which communicates with an interiorly disposed discharge hopper 15, is mounted in loading door 11. Discharge hopper 15 is located beneath a plurality of dispensers 16. Three dispensers 16 are used in machine 1. A plurality of selector push bottons or switches 17 are provided across the upper front region of loading door 11.

Figure 4:
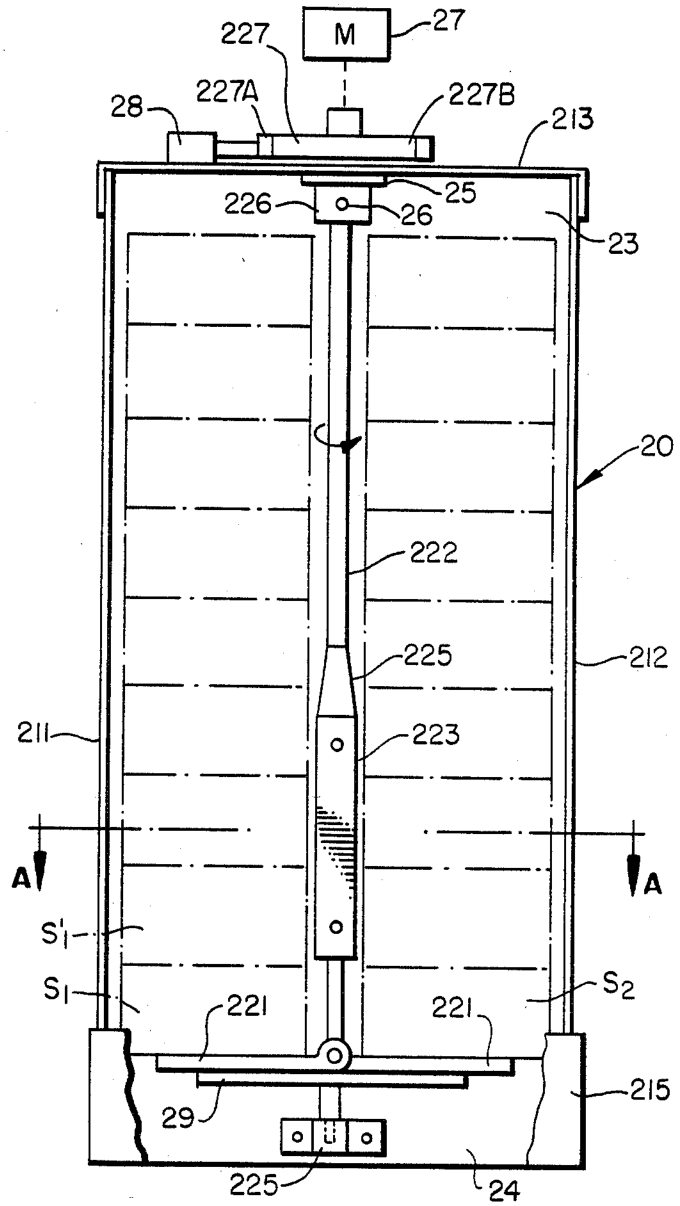
FIG. 4 is a front end view of a dispenser according to the invention.
Figure 5:
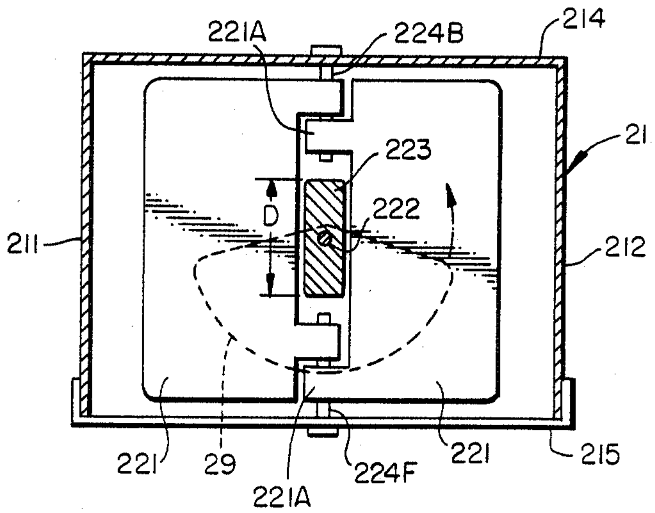
FIG. 5 is a sectional view taken along line A—A in FIG. 4.

As shown in FIGS. 3, 4 and 5, each dispenser 16 is comprised of two dispensing mechanism units 20 mounted next to one another with a common partition wall extending between units 20. Each unit 20 includes an article storage area 21 and a dispensing mechanism 22.

Article storage area 21 comprises vertically disposed side plates 211 and 212, one of which is used as a partitioning wall, upper plate 213 and back plate 214. A front support plate 215 extends across the front lower portion of side plates 211, 212 and is connected to both side plates. An opening 23 is formed between side plates 211, 212, upper plate 213 and support plate 215. Loading of articles into storage area 21 occurs through opening 23. As shown in FIG. 3, storage area 21 is provided ith a suitable stopper, such as stopper rod 30 to prevent articles from dropping out of storage area 21 through opening 23. Storage area 21 also has a bottom discharge opening 24 through which articles are dispensed.

A dispensing mechanism 22 is disposed within article storage area 21 and comprises a pair of flappers or doors 221, a rotatable shaft 222, a holder member 223 and a driving mechanism for rotating rotatable shaft 222.

A support shaft 224F is removably attached to front support plate 215 and another support shaft 224B is removably attached to back plate 214. Support shafts 224F and 224B are axially spaced from one another and extend along a common axis. Each rectangular-shaped door 221 is pivotably supported by both support shafts 224 through a pair of supporting portions 221A extending from an edge of door 221 adjacent rotatable shaft 222. The pair of rectangular-shaped doors 221 are disposed in discharge opening 24 of storage 21 to control the discharge of articles through opening 24. Rotatable shaft 222 extends vertically through the central portion of storage area 21 to divide storage area 21 into two columns for stacking the articles in two rows or stacks at the left and right sides of rotatable shaft 222. Thus, one door 221 is placed in storage area 21 below each column of articles. The lower end portion of rotatable shaft 222 is rotatably supported by a support element 225 which is fixed to and extends from the inner surface of back plate 214. The upper end portion of rotatable shaft 222 is connected to the driving mechanism which is attached to upper plate 213. The driving mechanism includes a coupling member 226 which is rotatably supported by upper plate 213 through bearing 25. Rotatable shaft 222 is connected to coupling member 226 by a pin 26. Coupling member 226 is also connected to a motor 27 through a reduction mechanism. Thus, coupling member 226 is coupled between rotatable shaft 222 and motor 27; whereby, rotatable shaft 222 is driven by motor 27 through coupling member 226.

Coupling member 226 has a cam portion 227 which has two equiangular spaced cut-out portions 227A and 227B at its peripheral surface. A switch element, such as microswitch 28, is disposed adjacent the outer periphery of cam portion 227 to control the operation of motor 27. A switch lever of microswitch 28 contacts the outer peripheral surface of cam portion 227 and moves in correspondence with the configuration of cam portion 227. The operation of microswitch 28 is thus controlled by the rotation of cam portion 227. In this embodiment, cut-out portions 227A and 227B are formed at an angular offset of 180°, whereby the operation of motor 27 is stopped after shaft 222 rotates 180°. Motor 27 is selectively operated in response to the deposit of a predetermined coin value by a customer and stops after shaft 222 rotates 180° from its starting position.

Rotatable shaft 222 has an arc shaped control plate 29 at its lower end portion. Control plate 29 contacts the lower or back surface of doors 221. When control plate 29 is in contact with both doors 21, both doors 221 lie in a horizontal position, and the discharge of articles through opening 24 is blocked. Holder member 223 is removably attached to rotatable shaft 222 at a position adjacent its lower end portion i.e., holder member 223 is at least aligned with the articles which are stacked above the lowermost article in a column. Holder member 223 has a rectangular cross-section so that it has a pair of opposite long sides and a pair of opposite short sides. The short sides of holder member 223 act as holding portions to engage the articles against the inner surface of side plates 211, 212 and hold the articles in position while the articles below the held articles discharge through the opening 24. The length D of the long sides of holder member 223 is selected long enough to correspond with the size of articles and accomplish this engagement. A plate which has a high frictional resistance may be attached on the holding portions of holder member 223 to improve the holding capability of the holder member. Holder member 223 also has a slanted upper portion 225 which acts as a guide surface for the articles. Holder member 223 is shown positioned adjacent the articles above the lowermost article. However, if a particular storage area 21 is to dispense another number of articles, e.g. two articles at a time, holder member 223 can be positioned to hold articles above the desired number to be dispensed.

Figure 6:
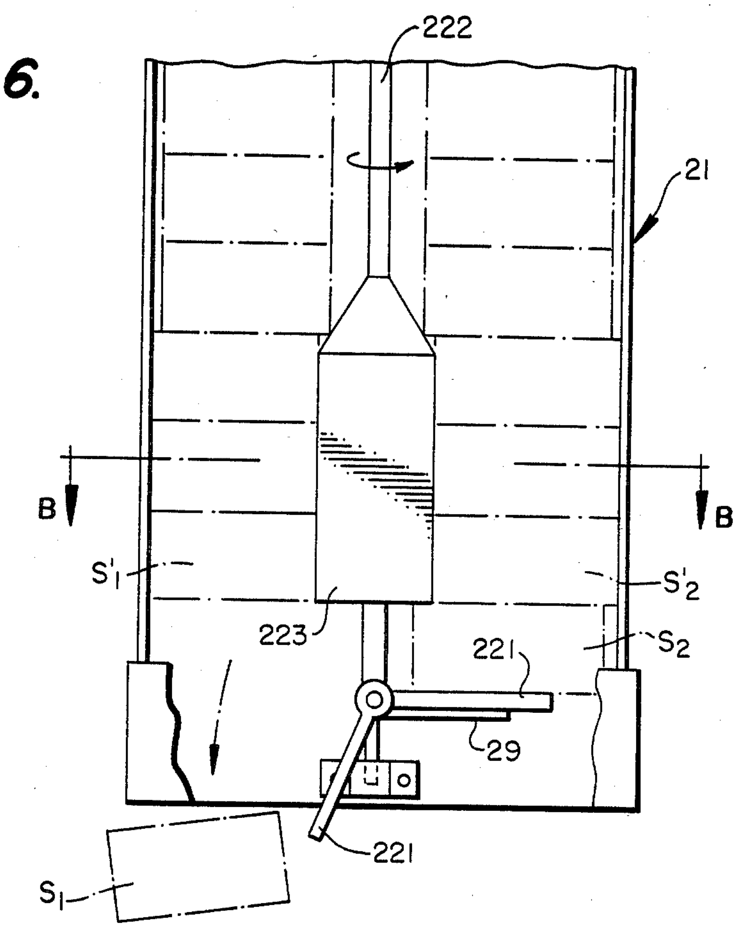
FIG. 6 is a partial front end view of the dispenser of FIG. 3 illustrating its operation.
Figure 7:
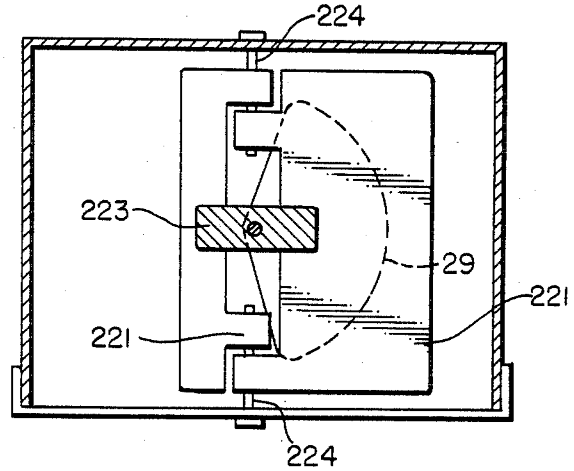
FIG. 7 is a sectional view taken along line B—B in FIG. 6.

Referring to FIGS. 6 and 7, the operation of dispenser 16 will be described. The articles or packages containing beverages are loaded within storage area 21 through front opening space 23 and piled on each door 221. When motor 27 is energized by a signal from the vending switch, shaft 222, coupling member 226, holder member 223 and control plate 29 are rotated. The direction of rotating movement is shown by an arrow in FIG. 5. Just before control plate 29 moves from its contact position with one of the doors 221, i.e., rotatable shaft 222 has almost rotated 90° from its initial position, the articles which are stacked above the lowermost article are frictionally engaged between the inner surface of each side plate 211, 212 and the holding portion of holder member 223. The articles, except the lowermost article, are thus held in position.

When rotatable shaft 221 has rotated 90° from its initial position, one of doors 221 is released from a rotation preventing condition, and rotates or pivots downward around support shafts 224. The article above the released door 221, which is not held by holder member 223, is delivered to vending stage 14 through discharge opening 24 and hopper 15. The rotation of holder member 223 and control plate 29 continues until rotatable shaft 222 has rotated 180°. During this rotation, control plate 29 again contacts the released door 221 and pushes it upward to move it to its former horizontal position.

Figure 8:
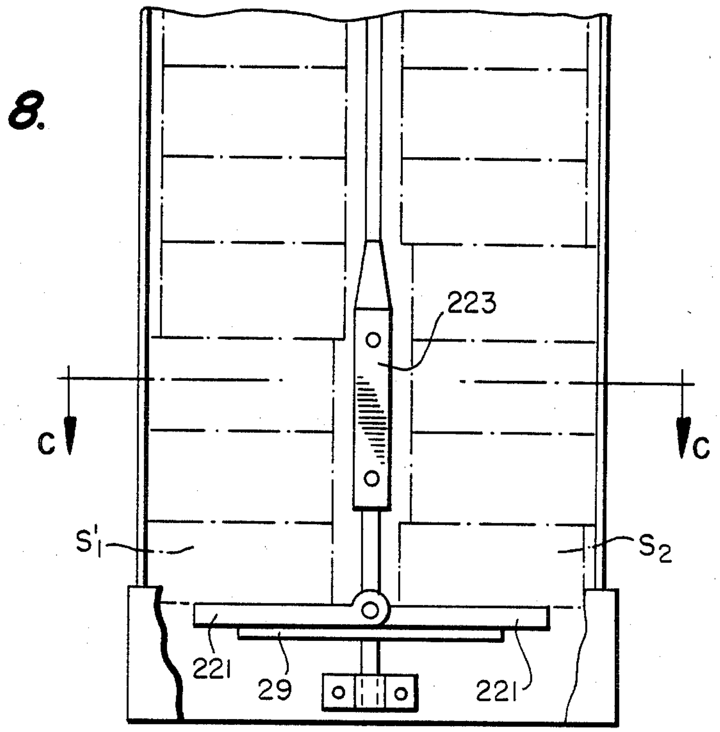
FIG. 8 is a partial front end view of the dispenser of FIG. 3 illustrating its operation.
Figure 9:
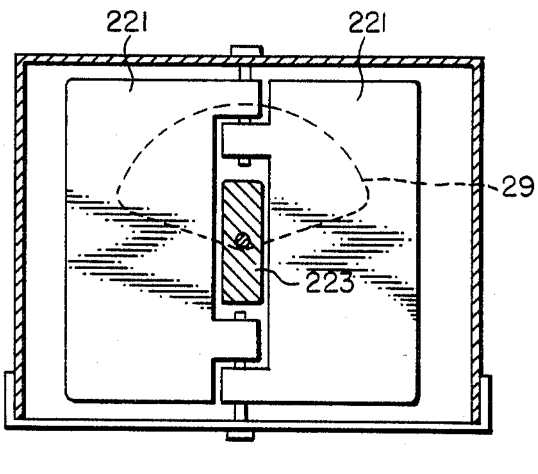
FIG. 9 is a sectional view taken along line C—C in FIG. 8.

After rotatable shaft 222 has rotated 180°, the operation of motor 27 is stopped by the operation of switch 28. At this time, as shown in FIGS. 8 and 9, the articles which had been engaged between holder member 223 and side plates 211, 212 are released from the held condition and slide down on top of the one door 221. The lowermost article, which is stacked on the other door 221 will be delivered by next operation of the dispenser.

As mentioned above, the doors are rotatably supported on two shafts which lie on the same axis so that the space required for the supporting portion of the doors in the article storage can be reduced. Also, the articles can be smoothly delivered without obstruction from supporting portions of the doors.

Figure 10:
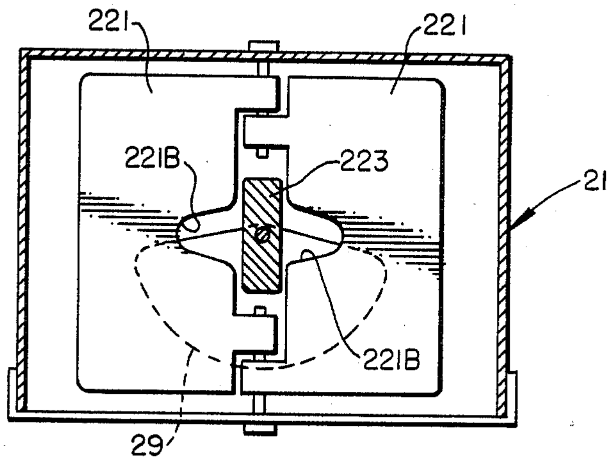
FIG. 10 is a sectional view similar to FIG. 5 illustrating another embodiment of the invention.

Referring to FIG. 10, another embodiment of the present invention is shown. This embodiment is directed to a modification of the doors of FIGS. 4 and 5 to improve their operation. Each door 221 of this embodiment has a cut-out portion 221B at the center portion of one edge which is adjacent to rotatable shaft 222. In the first embodiment, when one door is released from its horizontal position and the article is delivered, door 221 can hit against rotatable shaft 222. Cut-out portion 221A of this embodiment alleviates this problem, because both doors can rotate around support shaft 224 almost 90° and thus smoothly deliver the article.

Figure 11:
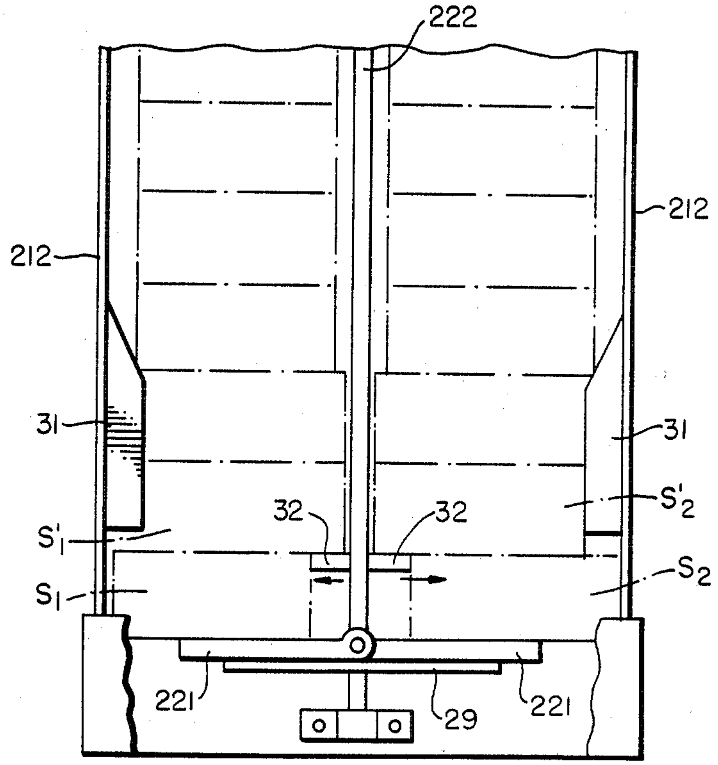
FIG. 11 is a partial front end view of a dispenser according to another embodiment of the invention.
Figure 12:
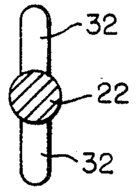
FIG. 12 is a sectional view of the rotatable shaft used in FIG. 11.

Referring to FIGS. 11 and 12, a further embodiment of the present invention is shown. This embodiment is directed to a modification of the holding mechanism for the articles. The holding mechanism for articles in this embodiment comprises a side spacer 31, which is removably fixed on the inner surface of each side plate 211 and 212, and separators 32 affixed to and extending in opposite directions from rotatable shaft 222. Each of side spacer 31 is placed in alignment with the lower stored articles above the lowermost article and has a slanted surface at its upper portion formed as guide surface for the articles. The depth of spacers 31 is selected to accomodate the size of the stored articles.

Separators 32 are located to extend below the lower surface of first article stacked above the lowermost article resting on door 221. In this embodiment, as shown in FIG. 12, the diameter of separator 32 is formed smaller than the diameter of rotatable shaft 222 to alleviate catching with the articles held above separator 32. During the rotation of rotatable shaft 222, separator 32 contacts the side surface of the lowermost article to push it toward side plate 211 or 212, and moves under the article directly above the lowermost article. The lowermost article is thus smoothly delivered and the remaining articles are maintained in a standing position within storage area 21.

This invention has been described in detail in connection with preferred embodiments, but these embodiments are merely for example only and this invention is not restricted thereto. It will be easily understood by those skilled in the art that other variations and modifications can be easily made within the scope of this invention, as defined by the appended claims.

We claim:

1. In an article dispenser for vending machines including an article storage area for holding articles in a stacked disposition, a rotatable shaft extending vertically within said storage area, said storage area having a bottom opening through which the articles are dispensed and a front opening through which articles can be loaded into said storage area to form first and second vertical rows on either side of said rotatable shaft, and a dispensing mechanism attached to a lower end portion of said rotatable shaft to dispense articles through said bottom opening of said storage area upon rotation of said rotatable shaft, the improvement comprising said dispensing mechanism including a pair of pivotable doors disposed in said bottom opening to block the passage of articles through said bottom opening, one of said doors being located below the first row of articles and the other of said doors being located below the second row of articles, each of said doors being pivotably supported by supporting shafts attached to the article dispenser, a control plate fixed on a lower end of said rotatable shaft for rotary motion with said rotatable shaft and for contacting a lower surface of said pivotable doors to control the pivoting movement of each of said pivotable doors between an open and a closed position, said control plate being dimensioned to support both said pivotable doors in the closed position at a first rotary position and to allow one of said pivotable doors to pivot to the open position while supporting the other of said pivotable doors in the closed position at a second rotary position spaced approximately ninety degrees from said first rotary position, and a holder member fixed on said rotatable shaft, said holder member having a holding portion to stop the dispensing of articles above the desired number when one of said doors pivots to its open position.

2. The article dispenser as claimed in claim 1 wherein said supporting shafts are axially spaced and extend along a common axis.

3. The article dispenser as claimed in claim 1 wherein each of said pivotable doors has a cut-out portion along the edge adjacent said rotatable shaft for allowing said pivotable doors to pivot downward without hitting said rotatable shaft.

4. The article dispenser as claimed in claim 1 wherein said holder member has a rectangular shaped cross section with the short sides of the rectangle forming said holding portion to engage the articles between an inner surface of said storage area and said short sides.

5. The article dispenser as claimed in claim 4 wherein a material having high frictional resistance is attached on each of said short sides.

6. The article dispenser as claimed in claim 4 wherein said holder member is removably fixed to said rotatable shaft.

7. The article dispenser as claimed in claim 1 wherein said holder member comprises a projection extending from said rotatable shaft and a spacer attached on the inner surface of said storage area, said projection being located to move the article to be dispensed toward said inner surface of said storage area, said projection further being located to extend beneath the surface of the lowermost article to remain in said storage area during the rotation of said rotatable shaft to the open position of said pivotable doors.

8. The article dispenser as claimed in claim 7 wherein said spacer is removably attached on the inner surface of said storage area.

* * * * *